United States Patent Office.

JOHN F. BOYNTON, OF SYRACUSE, NEW YORK.

Letters Patent No. 66,785, dated July 16, 1867.

IMPROVEMENT IN CONVERTING IRON INTO STEEL.

*The Schedule referred to in these Letters Patent and making part of the same.*

TO ALL WHOM IT MAY CONCERN:

Be it known that I, JOHN F. BOYNTON, of Syracuse, in the county of Onondaga, and State of New York, have invented a new and useful Improvement in the Method of Converting Iron into Steel, and of expelling from iron its impurities, such as sulphur, arsenic, phosphorus, and other substances easily evaporated, with which iron combines; and I do hereby declare that the following is a full, clear, and exact description thereof.

The nature of my invention consists in passing a current of carburetted hydrogen gas, carbonized air, or other gases, carbonized, over iron in a highly heated state, as hereinafter described.

The iron to be operated upon is placed in a tight oven or chamber, and heated therein to nearly a welding heat. Into one side or end of this chamber or oven a jet of carbonized gas or air is introduced through a common gas pipe, and from the opposite side or end the unconsumed gas, and new gases formed in the oven, escape through a similar pipe. A number of induction and eduction pipes may be used in the same oven. As the gas passes through the oven or chamber, over and around the heated iron, the carbon contained in it combines with the iron, converting it into steel or steely iron, and at the same time the impurities in the iron, such as sulphur, arsenic, phosphorus, and the like, will be expelled therefrom, and pass off with the residuum of gas through the eduction pipe or pipes. If the escaping gas be lighted it will be found to burn with very little illumination, thus showing that it has been deprived of its carbon in passing through the oven, and by this means it will always be easy to ascertain whether the requisite quantity of gas is introduced, as, if the escaping gas burns with a bright light, it may be known that more gas is passing through the oven than will give up its carbon to the iron.

As gas containing a large amount of carbon will be the most efficient, I prefer to use hydrogen gas, carburetted and enriched by mixing with it the vapors of hydrocarbons, according to any of the known processes of producing that result. When the heavy hydrocarbons are heated to their points of evaporation, their vapors combine with gases as readily as those of the lighter ones, and are carried forward to the point of use, and as the products of gas-tar are amongst the richest in carbon, they are the most valuable for carburetting gas to manufacture steel according to my process; and as the vapors of oils contain few impurities, the steel made by the use of them resembles cast steel, while steel produced by charcoal heated in an oven in contact with iron is liable to contain the impurities of the charcoal used, or to be modified by the silex, soda, potash, lime, and other earthy substances contained in the charcoal.

Iron may be heated in contact with carburetted gases until perfectly converted into steel, and then by increasing the heat it may be melted and drawn off into moulds, forming ingots, and when so formed will be free from bubbles, flaws, and impurities, and will be finer grained than when made in the ordinary way.

Atmospheric air may be in like manner used for conveying hydrocarbon vapors through a converting-oven, in which case the oxygen combines with a portion of the hydrogen to form water, which is passed out through the vents in the form of steam, mingled with a trace of carbonic oxide, while the nitrogen will assist the carbon to combine with the iron and convert it into steel.

Hydrocarbon vapors may in like manner be forced through the converting-oven without admixture with either gases or air, and will produce the desired effect.

The length of time during which the heated iron should be subjected to the process of passing the gas over it, will depend in some degree upon the size of the bars or pieces of iron to be operated upon, but I have found by experiment that hoop iron, one-eighth of an inch in thickness, will be converted into steel in about one hour, and that the gas consumed will not exceed three and a half feet to the pound of iron operated upon, if the gas be sufficiently charged with carbon.

I do not claim any particular form of oven or chamber for carrying this process into effect, as any kind of a tight chamber, in which the iron can be sufficiently heated, and through which a current of gas can be conducted, will answer the purpose.

Other gases, such as carbonic acid, carbonic oxide, nitrogen, and ammoniacal gases, may be used instead of carburetted hydrogen, if sufficiently charged with carbon, by being first passed through a carburetter and combined with hydrocarbon vapors.

When it is desired to convert one portion only of a piece of iron into steel, this may be done by coating that portion not to be converted with a wash made of silicate of alumina or silicic acid, or both combined, mingled with lime, or other alkaloid substance, which will prevent the portion so coated from being converted into steel.

In a similar way that sulphur is expelled from iron by carburetted hydrogen or hydrogen gas carbonized, so oxygen may be removed from oxides of iron. The oxygen combining with the hydrogen forms water, and escaping as highly heated steam the oxide of iron is thus reduced to metallic iron, and the carbon of the gas uniting with the metallic iron converts it into steel. When this is effected the iron will be converted into sponge steel, and in this state can be pressed, hammered, or rolled into bars, or the temperature may be increased until the whole mass is melted and the metal run into moulds, thus converting the ores of iron directly into steel at one heating.

I do not claim passing over iron in a highly heated state ordinary carburetted hydrogen gas, but what I do claim as my invention, and desire to secure by Letters Patent, is—

1. In carrying the above-described method into effect, the use of hydrogen gas, surcharged with carbon by passing it through a carbonizing vessel and mixing or combining it with hydrocarbon vapors, by any known means of producing that result.

2. I also claim, in carrying the above-described method into effect, the use of other gases hereinbefore mentioned, when charged with hydrocarbon vapors.

3. I also claim, in carrying the above-described method into effect, the use of atmospheric air, charged with hydrocarbon vapors, by any known means of producing that result.

4. I also claim, in carrying the above-described method into effect, the heating of heavy hydrocarbons to cause their vapors more readily to mix or combine with the gases or air, and be carried forward therewith.

5. I also claim melting iron, or the nitro-carbonized compound, after it has been converted into steel by the above-described method, and thereby converting it into cast steel, as described.

6. I also claim, in carrying the above-described method into effect, the use of hydrocarbon vapors without admixture with gas or air, as and for the purpose set forth.

7. In carrying into effect the method herein described of converting iron into steel, I claim coating a portion of any piece of iron with a wash, as described, to prevent the portion so coated from being converted into steel.

8. I also claim converting the oxides of iron directly into steel by one heating, by passing carburetted or carbonized hydrogen gas over and through the same, when in a highly-heated state, according to the method or process herein described.

JOHN F. BOYNTON.

Witnesses:
   J. J. COOMBS,
   JOS. L. COOMBS.